Mar. 27, 1923.
E. H. WHEELER.
RECESSING TOOL HOLDER.
FILED FEB. 24, 1921.
1,449,475.
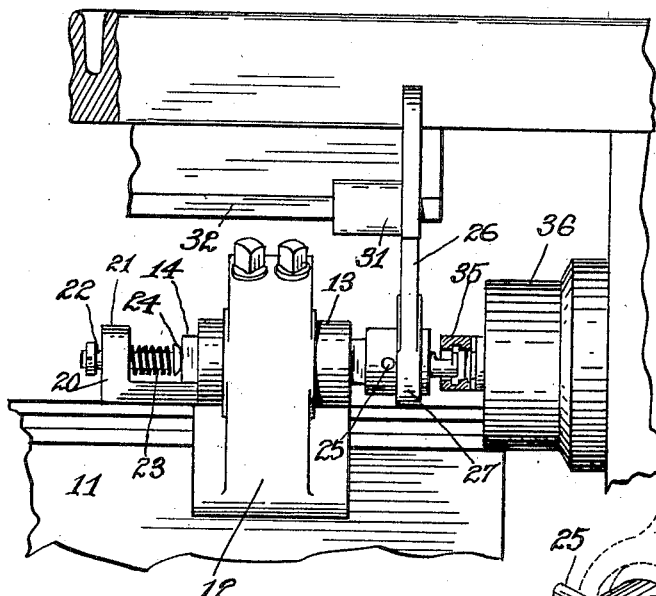
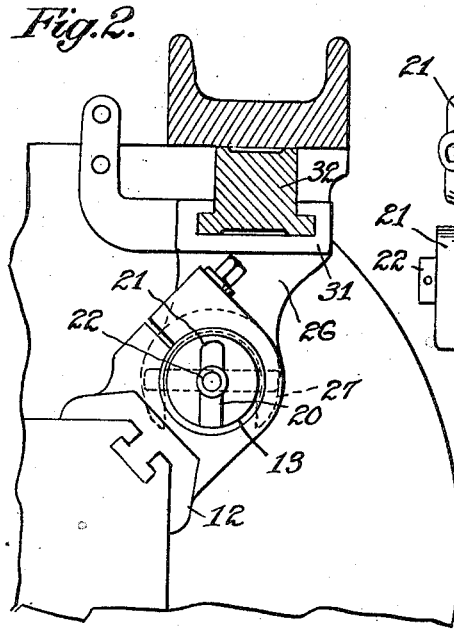
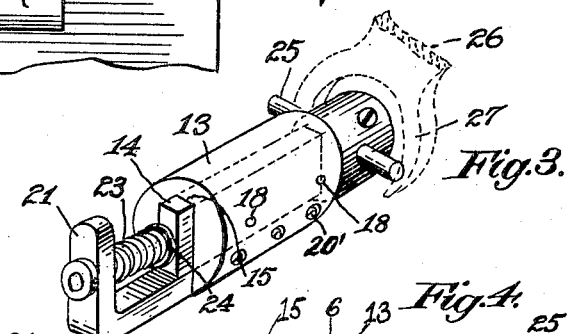
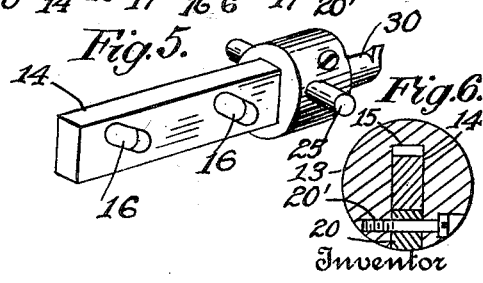
Inventor
E. H. Wheeler
By his Attorneys:

Patented Mar. 27, 1923.

1,449,475

UNITED STATES PATENT OFFICE.

EARL HENRY WHEELER, OF WINDSOR, VERMONT, ASSIGNOR TO THE NATIONAL ACME COMPANY, OF CLEVELAND, OHIO, A CORPORATION OF OHIO.

RECESSING-TOOL HOLDER.

Application filed February 24, 1921. Serial No. 447,410.

*To all whom it may concern:*

Be it known that I, EARL H. WHEELER, a citizen of the United States, residing at Windsor, in the county of Windsor and State of Vermont, have invented certain new and useful Improvements in Recessing-Tool Holders, of which the following is a specification.

This invention relates to recessing tool holders, the object thereof being to provide an improved machine of this general type which will be simple in construction, efficient in operation, and easily and inexpensively manufactured.

A further object of this invention is to provide an improved recessing tool holder so constructed as to permit the recessing tool to cut a straight recess in the work, or in other words, a recess at right angles with the center line or longitudinal axis of the work.

Heretofore recessing tools usually cut a tapered recess because the tools did not have a positive and straight up-and-down or transverse movement, or the mechanism for shifting the tool was operated by engagement with the end of the work thereby depending entirely upon the position of the work for accuracy. The present improvement also does away with the old spiral travel of the tool and also with the old style sliding or dove-tailed construction.

My improved tool holder, however, comprises a novel arrangement of parts and instrumentalities whereby these disadvantages are obviated, and in operation of the recessing tool, the same by virtue of my improved construction, will have a positive and a straight transverse or up-and-down movement thereby cutting a recess having straight or vertical sides.

A further object of this invention is to provide an automatic machine having a recessing tool, which does not depend upon the length of the piece or work to be recessed, but which can cut a recess in any piece at any distance from the end of the work. This advantage is obtained by means of an adjustable stop member adapted to cooperate with the recessing tool holder thereby permitting the tool to travel into the work to any desired depth.

Other objects of this invention will appear in the description thereof, reference being had to the accompanying drawing forming a part of this specification, wherein similar reference characters indicate corresponding parts in the several views, and wherein Fig. 1 is a view of my improved recessing tool holder, wherein the tool is shown at the completion of an operation; Fig. 2 is a rear elevation of the recessing tool holder; Fig. 3 is a perspective view of my improved tool holder, a portion of the stop mechanism being shown in dotted lines; Fig. 4 is a side elevation of a tool holder, parts being removed and showing in full lines the position of the various parts at the commencement of an operation; Fig. 5 is a perspective view of the sliding member or filler block of the tool holder; Fig. 6 is a section taken on line 6—6 of Fig. 4.

My improved recessing tool holder is so constructed that it is adapted to be used on all types of machines having a revolving spindle such as, for instance, multiple spindle automatic lathes, single spindle automatic lathes, hand screw machines, and the like,—in the present instance my invention being shown as applied or adapted to a multiple spindle automatic lathe. This machine is merely illustrated in part and diagrammatically in Figs. 1 and 2, and comprises the usual work spindle or work holder 36 adapted to hold a tubular or hollow blank 35 to be worked upon.

In its preferred form herein shown and described, my recessing tool holder comprises in general a supporting member and a companion member movable therein, the latter constructed to support or carry a recessing tool. The several members are provided with cooperating camming means, and stop or limiting means is provided for cooperating with the movable member for limiting the movement thereof relatively to the supporting member, the construction being such that after the tool holder comprising the companion members travels to such a position with relation to the work, that the recessing tool comes into the desired position in readiness to operate upon the work, the stop means is adapted to limit the forward movement or travel of the movable companion member. Thus upon the independent and continuing movement of the supporting member toward the work and relatively to the movable member, the camming means will be operative to shift the movable member in a direction at right angles to the direction of movement of the tool holder, thus causing the tool to cut a recess in the work at right angles to the longitudinal axis of the work.

With reference to the drawings, it will be seen that my improved recessing tool holder 12 is mounted upon the face of the tool slide 11 and held thereon by any suitable means. The tool holder 12 is bored to a suitable diameter to permit the insertion of a bushing 13 held therein in any desired manner, although it is to be understood that the same may be cast integrally with the tool holder if desired. Into the bushing 13 is milled a slot of suitable depth and width, and in this slot is placed a filler or slide block 14 constructed in the present instance with an elongated rectangular portion terminating in a cylindrical portion of greater diameter.

This movable block or member 14 is adapted to slide freely in the bushing 13, the slot therein being of greater depth than the width of the block, as shown at 15 in Fig. 4. In the filler block 14 are machined at suitable angles a plurality of elongated slots 16 of suitable length and distance apart, two being shown in the present instance, by way of illustration. Into each of these slots is placed a roll 17 so constructed as to have sufficient play in order to roll freely in the elongated slot 16. Through these rolls are drilled holes for the reception of pivot pins 19, which are held in aligned holes 18 in the bushing 13. Thus the rolls 17 supported in this manner by the bushing 13 are adapted to ride or travel in the angular slot 16 and support the sliding block 14 in its various operative positions. The bushing 13 is suitably slotted at its under-side for the insertion of an arm 20 bolted or otherwise secured thereto, as shown particularly at 20′ in Fig. 6. This piece or arm is thus held rigidly in position, and the end thereof projects rearwardly substantially parallel to the filler or sliding block 14. This arm is provided with an offset or bent portion 21, which is bored with a hole of suitable diameter. Through this hole slides freely a plunger 22, which is normally held in the position illustrated in Fig. 4 by means of a coiled spring 23 placed around the plunger. At its inner end the plunger is machined so as to provide a flange or head 24, which prevents the spring 23 from freeing itself.

Inserted in the cylindrical end of the filler block 14 or the end nearest the work is a stop pin 25 suitably held in a hole drilled through the end of the filler block, both ends of the pin 25 extending a substantial distance from the outer surface of the filler block. Adapted to cooperate or engage with this pin 25 at predetermined times is a stop member 26, which in the present embodiment is shown as fork-shaped at one end, the projecting prongs 27 thereof constructed to embrace loosely the cylindrical end of the block 14, and as illustrated in Figs. 1 and 3, to impinge on the protruding ends of the stop pin 25, one prong engaging on one end of the pin and one on the opposite end thereof.

In the front face of the filler block 14 is drilled a hole of suitable diameter, in which is inserted the recessing or cutting tool 30, which is held or retained therein in any preferred manner. In the present case the stop member 26 is provided with slides 31 cooperating with and shiftable on the horizontal ways 32, and is thus adjustable to permit the cutting tool to enter the work to any desired depth. Hence, it will be observed that by means of these cooperating stop members, one thereof being adjustable, the recessing tool can recess any work or blank to any depth inasmuch as it will be readily seen that the depth of ingress of the cutting tool before commencing to cut will be controlled by the adjusted position of the depending stop member 26.

In operation, as the recessing tool holder travels toward the work 35 and the tool 30 enters the work to a position for cutting a recess, the stop pin 25 will strike against the cooperating stop member 26. Thereupon the slide block 14 will be stopped or limited in its travel, but the tool holder and bushing 13 will still travel a suitable distance further. Hence, when the block 14 is thus arrested and the bushing 13 moves forward relatively thereto, the rolls 17 are carried forwardly to the position illustrated in dotted lines in Fig. 4. The block 14 being held from forward movement, the rolls 17 will travel or ride forwardly in these slots and by virtue of a camming action will force the block 14 directly upwardly at right angles to the longitudinal axis of the tool holder. As the block 14 moves upwardly by virtue of the action of the camming means 16 and 17, the cutting tool will start to cut a recess in the work. This upward movement is caused by virtue of the angular elongated camming slots, which are machined as hereinbefore described at a suitable angle. It will be observed therefore, that the cutting depth of the cutting tool is determined or measured by the angle at which the slots 16 are positioned with reference to the longitudinal axis of the slide block 14, a greater angle resulting obviously in a deeper cut and vice versa. After the tool holder has traveled to its prescribed position, the recessing tool will have completed the cutting work and will then be ready to be withdrawn from the work. As soon as the tool holder therefore, commences to travel rearwardly, the rolls 17 will start to travel in a reverse direction in the elongated cam slots, this movement being accomplished by virtue of the pressure or action of spring 23 in limiting or restricting the rearward movement of the slide block until the tension of the spring is destroyed, it being understood that the spring 23 during the forward movement of the tool holder relatively to the block 14, was placed under tension as illustrated in Fig. 1.

When the slide block 14 has reverted to its initial or normal position, the cutting tool will be free from the work and can be withdrawn by a backward movement of the tool holder. It will be understood of course, that the angle at which the cam slots 16 are cut may be varied if desired in order to vary the depth of cut of the recessing tool.

It will be further understood that the relative location of the camming rolls 17 and the camming slots 16 may be varied as desired without departing from the spirit of my invention, as for instance, the slots may be provided in the bushing or supporting member 13 and the camming rolls mounted in the slide block or movable member 14, the operation obviously being the same in either case.

Thus, it will be seen, that I have provided an improved recessing tool holder provided with a recessing tool which will have a positive up-and-down movement. By virtue of this improved but simple construction and arrangement of parts and by virtue of the positive action of the camming rolls and slots, the recessing tool in operation will be given a straight cutting movement substantially at right angles to the axis of the work. Furthermore, by means of the adjustable stop, which will have a positive action upon the tool holder, the result will be such that the recess will always be cut at the same point during each operation of the recessing tool.

It will be observed, with reference to the stop means 25 and 27 and the spring 23, that during the independent forward and rearward movement of the support 13 relative to its companion member 14, effective through the camming means 16 and 17 to shift the member 14 and the tool 30 in a transverse direction, the effect of these limiting means (comprising the spring and adjustable stop) is to firmly hold and retain the tool support 14 therebetween against forward or rearward movement, thus acting substantially as a guiding means to permit the tool 30 to have a positive straight up-and-down movement independent of the forward and rearward movement of the support 13 and continuing until the spring 23 is relieved from tension and the cam rolls 17 have returned to their normal position as illustrated in full lines in Fig. 4. It will be noted that the camming means, comprising spaced rollers and slots in the present instance, is located at one side of the tool and the axis of the cam rollers is substantially parallel, or extends in substantially the same direction, or is substantially in alinement with the tool axis. Hence when the cooperating members 13 and 14 are shifted one relatively to the other there is no tendency of the parts to cramp or jam and as a result more efficient and effective operation of the tool and operating members is obtained.

Although I have described a preferred embodiment of my invention, it is to be understood that I do not limit myself to the exact details of construction or arrangement of parts herein illustrated and described, but may make such changes and alterations as will come within the scope of the appended claims.

I claim as my invention:

1. A recessing tool holder comprising supporting means, a recessing tool carried thereby, means for shifting the tool transversely to its longitudinal axis, and slide mechanism adjustable relatively to the work into position to cause said last means to shift said tool transversely to its longitudinal axis.

2. The combination of work holding means, a tool holder, a recessing tool carried thereby and adapted to be shifted transversely to its axis, means for shifting the tool relatively to the work, and contact means including an adjustable slide located in position to stop the advance of the tool at predetermined times thereby to permit the same to be shifted transversely to its axis.

3. In a metal working machine the combination of means for holding a blank, a tool holder comprising a pair of cooperating members movable into position relatively to the blank, a recessing tool carried by one of said members, means for moving one of said members transversely relatively to the other, a shiftable stop mounted at one side of the tool holder and projecting into the path thereof whereby said means is effective to shift one of said members relatively to the other thereby to shift said tool to cut a recess in the blank.

4. The combination of work holding means, a tool holder, a recessing tool carried thereby, means for shifting the tool transversely to its axis, a stop carried by the tool holder, and a stop mounted at one side of the tool holder and extending into the path thereof, one of said stops being adjustable relatively to the work and both cooperating to cause said means to shift the tool.

5. In a machine of the class described, a tool holder comprising cooperating members movable relatively to the work to be recessed, a cutting tool carried by one of said members, stop means for limiting the movement of one of said members thereby to permit the companion member to move independently thereof in one direction, and spaced means located at one side of the tool for shifting one of said members transversely to the other.

6. In a machine of the class described, a tool holder comprising cooperating members movable together relatively to the work to be recessed, a cutting tool, and a pair of means for moving one relatively to the other in a transverse direction, said pair of means having the common axis thereof extending substantially in the same direction as the tool axis, and means for effecting the operation of said means.

7. In a machine of the class described, a recessing tool holder comprising cooperating members movable together relatively to the work to be recessed, a cutting tool, adjustable stop means for limiting the movement of one of said members thereby to permit its companion member to move independently thereof in one direction, and spaced means located at one side of the tool and operable by virtue of said independent movement for shifting said first member transversely to the direction of movement of said companion member.

8. In a machine of the class described, the combination of means for holding a blank to be operated upon, a tool holder, a cutting tool carried thereby, mechanism for shifting said tool and blank, one toward the other, and a pair of means for shifting said tool and blank one relatively to the other in a transverse direction, said pair of means having the common axis thereof extending in substantially the same direction as the tool axis, and means for effecting the operation of said last means.

9. A recessing tool holder comprising a supporting member and a companion member movable therein, a recessing tool carried by said last member, camming means carried by said members, stop means cooperating at predetermined times with said movable member for limiting the movement thereof relatively to said supporting member whereby upon the independent movement of said supporting member in one direction said camming means will be operative to shift said movable member in another direction thereby to cause said tool to cut a recess in the work, and a slide for adjusting said stop means.

10. A recessing tool holder comprising a supporting member and a companion member movable therein in a plurality of directions, a recessing tool carried by said last member, spaced camming means carried by said member at one side of the tool, and adjustable means for varying the depth of entrance of said recessing tool into the work.

11. In a metal working machine, the combination of means for holding a blank to be operated upon, a tool holder, a tool carried thereby, mechanism for shifting said tool and blank one toward the other, and a pair of means for shifting said tool and blank one relatively to the other in a transverse direction and located at one side of the tool.

12. In a metal working machine, the combination of means for holding a tubular blank, a tool holder comprising a supporting member and a sliding member, a tool carried by said sliding member, a plurality of camming means operative for shifting the sliding member and tool transversely and having the axis thereof extending in substantially the same direction as the tool axis.

13. In a metal working machine, the combination of means for holding a tubular blank, a tool holder comprising a supporting member and a sliding member, a tool carried by said sliding member, camming means operative upon moving said supporting member relatively to its companion member whereby the same will be shifted substantially at right angles thereto to permit said tool to cut a recess in the blank, said camming means comprising rolls carried by said supporting member, angular slots carried by said sliding member, and tension means for limiting the movement of said sliding member upon reversing the direction of movement of said supporting member relatively thereto.

14. In a metal working machine, the combination of means for holding a tubular blank, a recessing tool holder comprising a support, and a tool carried thereby and movable toward the blank to position the tool relatively thereto, said support being movable in one direction to shift the tool in a transverse direction thereby to cut a recess in the blank, and tension means for guiding said tool during such transverse movement.

15. In a metal working machine, the combination of means for holding a tubular blank, a recessing tool holder comprising a support, a movable member, and a tool carried thereby, all movable toward the blank to position the tool relatively thereto, cooperating means carried by said support and movable member effective upon movement of said support in one direction to shift the tool in a transverse direction thereby to cut a recess in the blank, and a guide spring cooperating with said movable member.

16. In a metal working machine, the combination of means for holding a tubular blank, a recessing tool holder comprising a support, a movable member, and a tool carried thereby, all movable toward the blank to position the tool relatively thereto, camming means carried by said support and movable member operative upon the forward and rearward movement of said support to transmit to said tool a movement transverse to the direction of movement of said support, and adjustable means for guiding said movable member.

17. In a metal working machine, the combination of means for holding a tubular blank, a recessing tool holder comprising a support, a movable member, and a tool carried thereby, all movable toward the blank to position the tool relatively thereto, camming means carried by said support and movable member operative upon the forward and rearward movement of said support to transmit to said tool a movement transverse to the direction of movement of said support, and adjustable and resilient means for guiding said movable member.

18. In a metal working machine, the combination of means for holding a tubular blank, a recessing tool holder comprising a support, a tool carried thereby and movable toward the blank to position the tool relatively thereto, said support being movable in one direction to shift the tool in a transverse direction thereby to cut a recess in the blank, and limiting means coacting with said tool and supported independently of the blank.

19. In a metal working machine, the combination of means for holding a tubular blank, a recessing tool holder comprising a support, and a tool carried thereby and movable toward the blank to position the tool relatively thereto, said support being movable in one direction to shift the tool in a transverse direction thereby to cut a recess in the blank, and adjustable limiting means coacting with said tool and supported independently of the blank.

20. In a metal working machine, the combination of means for holding a tubular blank, a recessing tool holder comprising a support, a tool carried thereby and movable toward the blank to position the tool relatively thereto, said support being movable in one direction to shift the tool in a transverse direction thereby to cut a recess in the blank, and limiting means comprising an adjustable stop and a spring effective at predetermined times for guiding the movement of said tool independently of said support.

21. In a metal working machine, the combination of means for holding a tubular blank, a recessing tool holder comprising a support, and a tool movably carried thereby, and movable toward the blank to position the tool relatively to the blank to be recessed, said support having a forward and rearward movement independently of the tool for transmitting to the same a transverse movement thereby to cut a recess in the blank, and means independent of the blank for limiting the forward movement of the tool.

22. In a metal working machine, the combination of means for holding a tubular blank, a tool holder comprising a supporting member and a sliding member, a tool carried by said sliding member, camming means operative upon moving said supporting member relatively to its companion member whereby the same will be shifted substantially at right angles thereto to permit said tool to cut a recess in the blank, and limiting means comprising an adjustable stop and a spring effective at predetermined times for guiding the movement of said tool independently of said supporting member.

23. In a machine of the class described, the combination of means for holding a blank to be operated upon, a tool holder, a cutting tool carried thereby, mechanism for shifting said tool and blank one toward the other, and means for shifting said tool and blank one relatively to the other in a transverse direction, said means comprising spaced cam elements located at one side of the tool.

Signed at Windsor, Vermont, this 21st day of February, 1921.

EARL HENRY WHEELER.